(12) United States Patent
Chen

(10) Patent No.: US 9,205,482 B2
(45) Date of Patent: Dec. 8, 2015

(54) METHOD FOR MANUFACTURING INTEGRATED ALUMINUM ALLOY BICYCLE FRONT FORK

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

(*) Notice: Subject to any disclaimer, the term of this patent is extended or adjusted under 35 U.S.C. 154(b) by 57 days.

(21) Appl. No.: 14/221,453

(22) Filed: Mar. 21, 2014

(65) Prior Publication Data

US 2015/0266081 A1 Sep. 24, 2015

(51) Int. Cl.
| | |
|---|---|
| *B21D 53/86* | (2006.01) |
| *B21D 19/00* | (2006.01) |
| *B21C 23/01* | (2006.01) |
| *B21J 5/02* | (2006.01) |
| *B21D 7/00* | (2006.01) |
| *B62K 21/02* | (2006.01) |
| *B21J 5/00* | (2006.01) |
| *B21K 1/74* | (2006.01) |
| *B21C 23/10* | (2006.01) |
| *B21D 41/04* | (2006.01) |

(52) U.S. Cl.
CPC .............. *B21D 53/86* (2013.01); *B21C 23/01* (2013.01); *B21D 7/00* (2013.01); *B21D 19/00* (2013.01); *B21J 5/025* (2013.01); *B21K 1/74* (2013.01); *B62K 21/02* (2013.01); *B21C 23/10* (2013.01); *B21D 41/04* (2013.01); *Y10T 29/49616* (2015.01); *Y10T 29/49622* (2015.01)

(58) Field of Classification Search
CPC .......... B21D 53/86; B21D 19/00; B21D 7/00; B21C 23/01; B21C 23/10; B21J 5/025; B21J 5/002; B21J 5/02; B21J 5/027; B62K 21/02; Y10T 29/49622; Y10T 29/49616; B21K 1/74
USPC ........ 29/897.2, 897; 72/253.1, 254, 338–341, 72/367.1, 370.13
See application file for complete search history.

(56) References Cited

U.S. PATENT DOCUMENTS

| | | | | | |
|---|---|---|---|---|---|
| 1,683,011 | A | * | 9/1928 | Andren | 29/413 |
| 2,207,004 | A | * | 7/1940 | Gruber et al. | 72/267 |
| 2,435,448 | A | * | 2/1948 | Kraeft et al. | 228/154 |
| 2,708,786 | A | * | 5/1955 | Watson | 228/155 |
| 3,564,566 | A | * | 2/1971 | Heitman | 29/423 |
| 3,788,820 | A | * | 1/1974 | Hunt | 428/586 |
| 4,033,024 | A | * | 7/1977 | Takahashi et al. | 29/403.2 |
| 4,051,704 | A | * | 10/1977 | Kimura | 72/58 |

(Continued)

*Primary Examiner* — David Bryant
*Assistant Examiner* — Bayan Salone
(74) *Attorney, Agent, or Firm* — Rosenberg, Klein & Lee

(57) ABSTRACT

A method for manufacturing an integrated aluminum alloy bicycle front fork is revealed. Aluminum alloy is extruded to form substrate having three rectangular bars. Cut the substrate to get a blank. The blank is set into a mold for forging the three rectangular bars into three round bars. Then burr and waste material are removed. Next the blank is set into another mold for extruding the three round bars and the three round bars are punched to have guide holes. The round bars are drilled along the guide holes and penetrated to form round tubes. A tube opening of two round tubes is flattened and narrowed. Then the two round tubes are bent downward to form fork tubes of a front fork. The rest tube forms a front fork stem. Thereby an integrated light weighted front fork with good structural strength and beautiful appearance is produced.

4 Claims, 4 Drawing Sheets

(56) References Cited

U.S. PATENT DOCUMENTS

| | | | |
|---|---|---|---|
| 4,287,747 A * | 9/1981 | Koshimaru et al. | 72/358 |
| 4,305,269 A * | 12/1981 | Kimura | 72/58 |
| 4,967,584 A * | 11/1990 | Sato et al. | 72/356 |
| 5,039,470 A * | 8/1991 | Bezin et al. | 264/255 |
| 5,644,829 A * | 7/1997 | Mason et al. | 29/421.1 |
| 5,829,768 A * | 11/1998 | Kaneko et al. | 280/93.502 |
| 5,884,722 A * | 3/1999 | Durand et al. | 180/312 |
| 6,049,982 A * | 4/2000 | Tseng | 29/897.2 |
| 6,105,413 A * | 8/2000 | Duggan et al. | 72/370.1 |
| 6,223,436 B1 * | 5/2001 | Dudash et al. | 29/897.2 |
| 6,257,041 B1 * | 7/2001 | Duggan | 72/370.25 |
| 6,375,888 B1 * | 4/2002 | Yeh | 264/516 |
| 6,419,250 B1 * | 7/2002 | Pollock et al. | 280/93.512 |
| 6,451,237 B1 * | 9/2002 | Miles | 264/219 |
| 6,460,250 B1 * | 10/2002 | Amborn et al. | 29/897.2 |
| 6,866,280 B2 * | 3/2005 | Chang | 280/281.1 |
| 7,051,564 B2 * | 5/2006 | Chang | 72/58 |
| 7,140,226 B2 * | 11/2006 | Wu | 72/370.06 |
| 7,178,240 B2 * | 2/2007 | Lo | 29/897 |
| 7,234,223 B2 * | 6/2007 | Liu | 29/527.1 |
| 7,251,979 B2 * | 8/2007 | Sakuragi et al. | 72/340 |
| 7,257,981 B2 * | 8/2007 | Natsui et al. | 72/377 |
| 7,281,726 B2 * | 10/2007 | Satou | 280/284 |
| 8,701,741 B2 * | 4/2014 | Di Serio et al. | 164/69.1 |
| 8,770,609 B2 * | 7/2014 | Dodman et al. | 280/276 |
| D719,880 S * | 12/2014 | Juarez et al. | D12/111 |
| 2004/0026890 A1 * | 2/2004 | Cobb | 280/276 |
| 2004/0093926 A1 * | 5/2004 | Natsui et al. | 72/377 |
| 2005/0092050 A1 * | 5/2005 | Chang | 72/61 |
| 2006/0016077 A1 * | 1/2006 | Liu | 29/897 |
| 2006/0130307 A1 * | 6/2006 | Lo | 29/421.1 |
| 2011/0221151 A1 * | 9/2011 | Sakamoto et al. | 280/124.1 |
| 2011/0316249 A1 * | 12/2011 | Thoma | 280/279 |

* cited by examiner

METHOD FOR MANUFACTURING INTEGRATED ALUMINUM ALLOY BICYCLE FRONT FORK

BACKGROUND OF THE INVENTION

1. Fields of the Invention

The present invention relates to a method for manufacturing an integrated aluminum alloy bicycle front fork, especially to a method for manufacturing an integrated bicycle front fork easily and conveniently by using aluminum alloy substrate.

2. Descriptions of Related Art

Generally, bicycles available now are formed by assembly of crowns, stems and forks. The crown, the stem and the fork are molded respectively and then connected integrally by adhesion, welding or screw fastening. However, such assembly way not only has higher cost but the weight of the final product is heavier, not meeting requirements of lightweight design. Moreover, since the structural strength of the connections between different components is weaker, the connections are easy to get damaged and broken due to vibration on bumpy roads. This poses a safety problem.

SUMMARY OF THE INVENTION

Therefore it is a primary object of the present invention to provide a method for manufacturing an integrated aluminum alloy bicycle front fork easily and conveniently by using aluminum alloy substrate.

In order to achieve the above object, a method for manufacturing an integrated aluminum alloy bicycle front fork of the present invention includes a plurality of steps. First aluminum alloy is extruded to form substrate having three rectangular bars arranged radially. Then cut the substrate to get a blank with a certain length. The blank is set into a mold for forging the three rectangular bars into three round bars. Burr and waste material generated after forging are cut and removed. Next the blank is set into another mold so that the three round bars of the blank are extruded and extended and front parts of the three round bars are punched to form guide holes. The three round bars are drilled along the guide holes and penetrated by drills to form three round tubes. A tube opening of each of two round tubes is flattened and narrowed. Then the two round tubes are bent downward to form fork tubes of a front fork while the rest round tube forms a stem of the front fork. Thus a bicycle front fork that features on good structural strength, light weight and aesthetic design is formed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
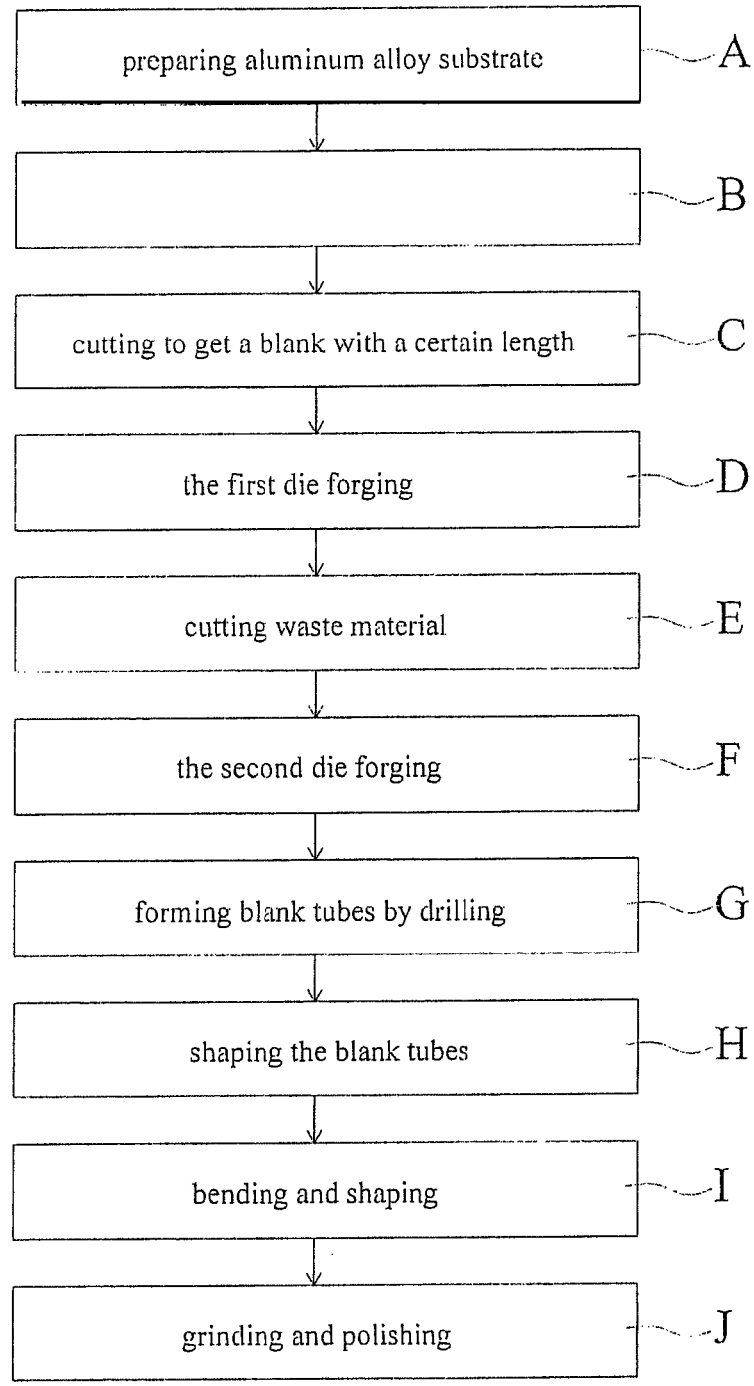
FIG. 1 is a flow chart of an embodiment according to the present invention.
Figure 2:
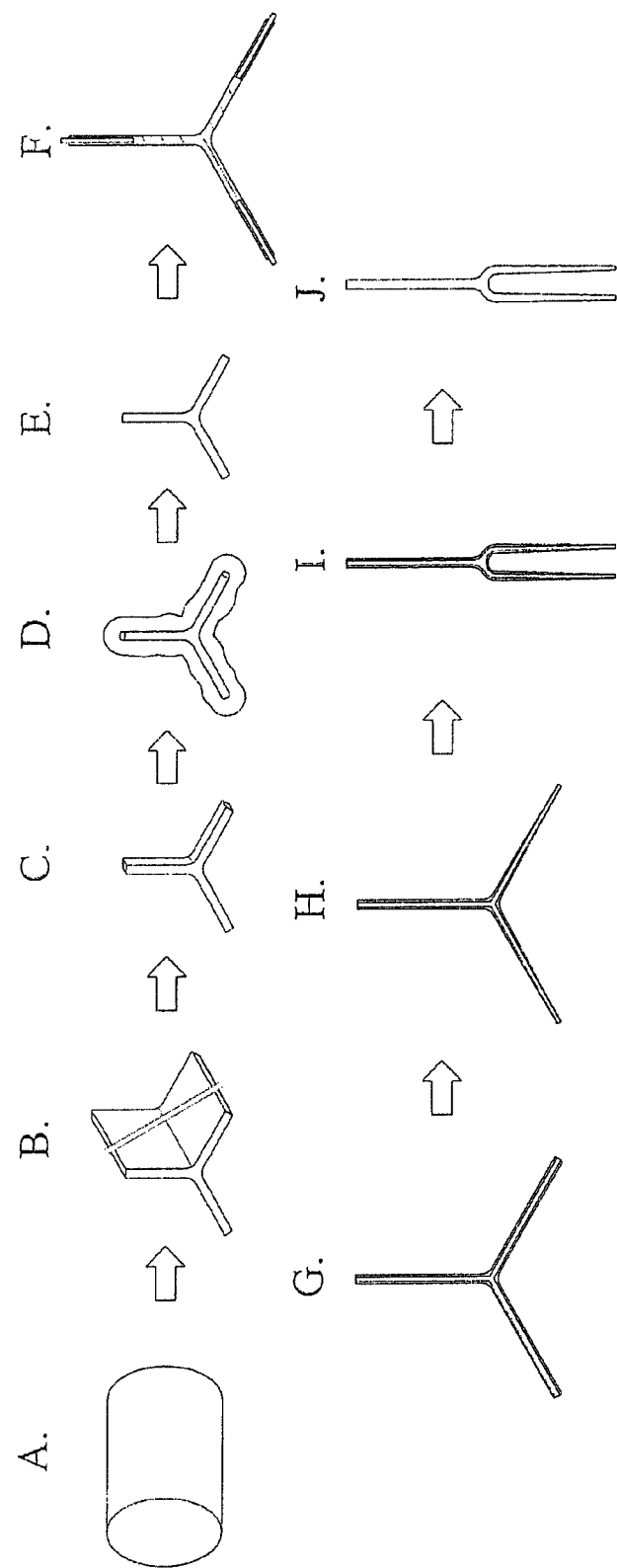
FIG. 2 is a schematic drawing showing implementation of an embodiment according to the present invention.

Refer to FIG. 1 and FIG. 2, a method for manufacturing an integrated aluminum alloy bicycle front fork according to the present invention includes following steps.

A. preparing aluminum alloy substrate:
  Prepare aluminum alloy substrate with a certain length.
B. extruding aluminum:
  Extrude the aluminum alloy substrate to form substrate having three rectangular bars connected integrally and arranged radially;
C. cutting to get a blank with a certain length:
  Cut the extruded substrate to get a blank with a certain length;
D. the first die forging:
  Set the blank got into a cavity of a first mold so that the blank is forged to have the same shape as the shape of the cavity of the first mold. The three rectangular bars of the blank are forged and molded into three round bars. At the same time, excess burr and waste material are generated after being forged and stamped.
E. cutting waste material:
  Cut and remove burr and waste material of the blank generated at the first die forging.
F. the second die forging:
  Set the blank into a cavity of a second mold so that the blank is forged to have the same shape as the shape of the cavity of the second mold. The three round bars of the blank are extruded and extended in the cavity and while a punch arranged in the cavity is driven into the three round bars of the blank at the same time. Thus front parts of the three round bars of the blank are punched and molded to form guide holes.
G. forming blank tubes by drilling:
  Drill the blank along the guide holes on the front part of each of the three round bars by drills. The three round bars of the blank are penetrated by the drills to form three round tubes each of which is a hollow blank tube.
H. shaping the blank tubes:
  Shape two of the three round tubes so that a front part of each tube gets tapered toward a tube opening. Then the tube opening is flattened and narrowed.
I. bending and shaping:
  Bend the two round tubes with flattened and narrowed tube openings downward and enable the two round tubes parallel to each other, having a certain interval therebetween to form two fork tubes of a front fork. The rest one round tube is located over and between the two fork tubes to form a stem of the front fork.
J. grinding and polishing:
  Treat a surface of the shaped front fork by grinding, polishing etc. to get a front fork product with a smooth appearance.

By the method of the present invention, an integrated bicycle front fork made from aluminum alloy is produced without places processed by bonding processing such as adhesion, welding, screw fastening, etc. Thus the structural strength of the whole bicycle front fork is improved and is more durable impact caused by larger and more frequent vibrations. Moreover, the labor hours for processing are saved and no connecting components are required. There are no joints or welds and the front fork looks smooth and flawless. No fork crown that connects the stem and the two fork tubes is required. Thus the cost of the front fork is reduced and the weight of the front fork is lighter.

Figure 3:
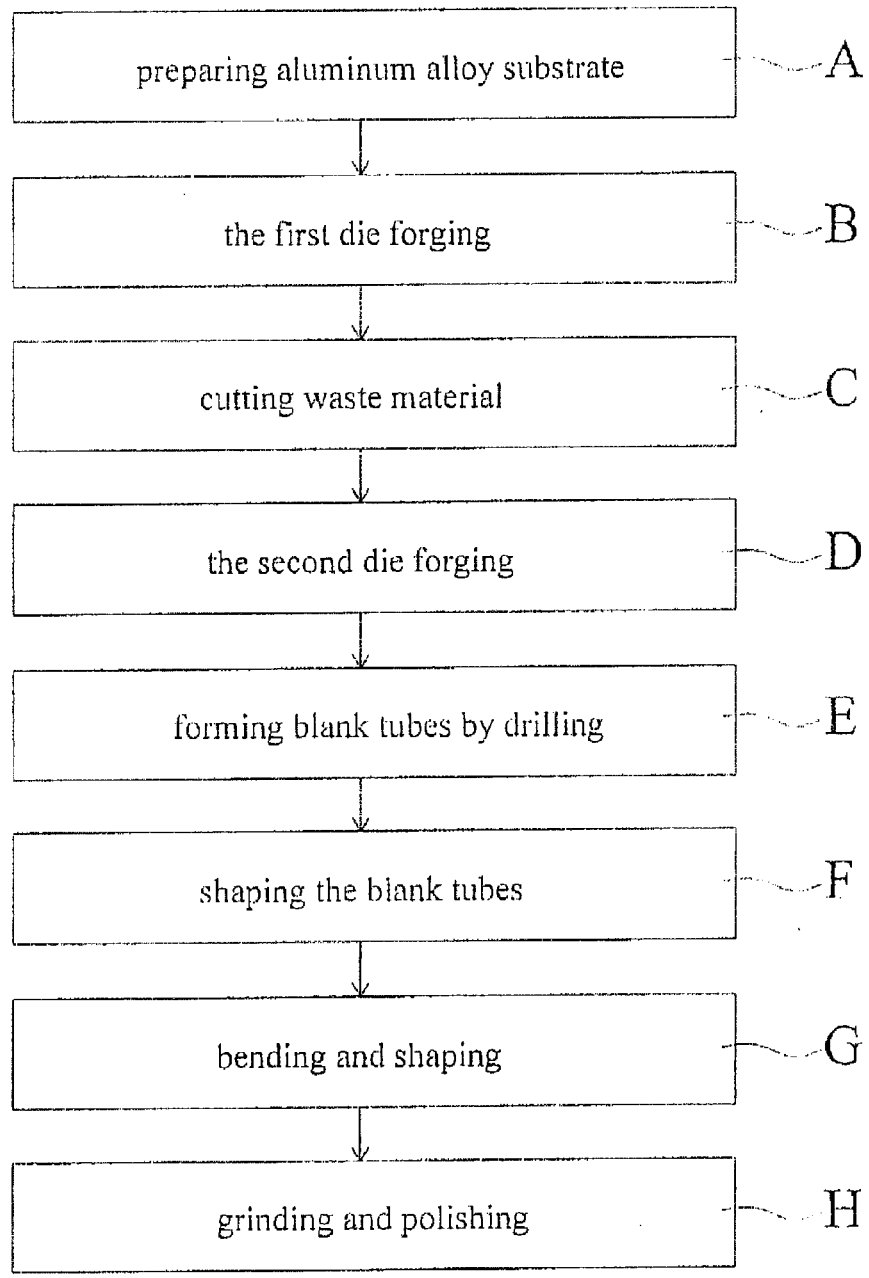
FIG. 3 is a flow chart of another embodiment according to the present invention.
Figure 4:
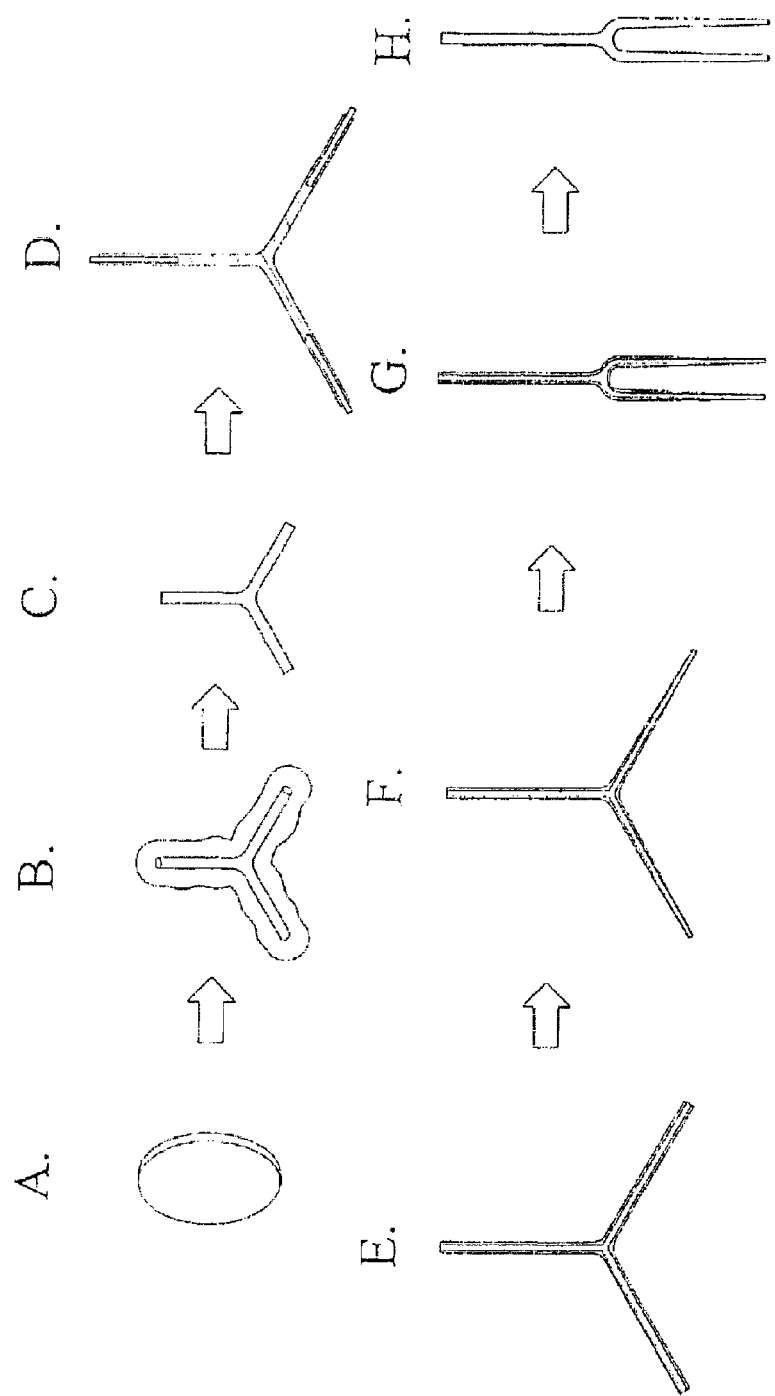
FIG. 4 is a schematic drawing showing implementation of an embodiment according to the present invention.

Refer to FIG. 3 and FIG. 4, another embodiment of the present invention having following steps is revealed.

A. preparing aluminum alloy substrate:
Take aluminum alloy substrate with proper size corresponding to a volume of a final product.

B. the first die forging:
Set the substrate into a cavity of a first mold so that the substrate is forged to have the same shape as the shape of the cavity of the first mold. The substrate is forged to form a blank with three round bars connected integrally and arranged radially. At the same time, excess burr and waste material are generated after being forged and stamped.

C. cutting waste material:
Cut and remove burr and waste material of the blank generated at the first die forging.

D. the second die forging:
Set the blank into a cavity of a second mold so that the blank is forged to have the same shape as the shape of the cavity of the second mold. The three round bars of the blank are extruded and extended in the cavity. Simultaneously a punch arranged in the cavity is driven into the three round bars of the blank for punching and molding front parts of the round bars to form guide holes.

E. forming blank tubes by drilling:
Drill the blank along the guide holes on the front parts of the three round bars by drills. The three round bars of the blank are penetrated by the drills to form three round tubes each of which is a hollow blank tube.

F. shaping the blank tubes:
Shape two of the three round tubes so that a front part of each tube gets tapered toward a tube opening. Then the tube opening is flattened and narrowed.

G. bending and shaping:
Bend the two round tubes with flattened and narrowed tube openings downward and enable the two round tubes parallel to each other, having a certain interval therebetween to form two fork tubes of a front fork. The rest round tube is located over and between the two fork tubes to form a stem of the front fork.

H. grinding and polishing:
Treat a surface of the shaped front fork by grinding, polishing etc. to get a front fork product with a smooth appearance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for manufacturing an integrated aluminum alloy bicycle front fork comprising the steps of:
    A. preparing aluminum alloy substrate with a certain length;
    B. extruding the aluminum alloy substrate to form substrate having three rectangular bars connected integrally and arranged radially;
    C. cutting the substrate having three rectangular bars to get a blank with a certain length;
    D. setting the blank into a cavity of a first mold for a first die forging so that the blank is forged to have a shape of the cavity of the first mold; the three rectangular bars of the blank are forged and molded into three round bars while burr and waste material are generated;
    E. cutting and removing the burr and waste material of the blank generated at the first die forging;
    F. setting the blank into a cavity of a second mold for a second die forging so that the blank is forged to have a shape of the cavity of the second mold and the three round bars of the blank are extruded and extended in the cavity; simultaneously using a punch in the cavity driven into the three round bars of the blank for punching and molding a front part of each of the three round bars to form guide holes;
    G. drilling the blank along the guide holes on the front part of the round bar by drills and penetrating the three round bars of the blank to form three round tubes each of which is a hollow blank tube;
    H. shaping two of the three round tubes so that a front part of each of the two round tubes gets tapered toward a tube opening of the round tube and then flattening and narrowing the tube opening; and
    I. bending the two round tubes having the flattened and narrowed tube opening respectively downward and enabling the two round tubes parallel to each other, having a certain interval therebetween to form two fork tubes of a front fork while the rest one round tube is located over and between the two fork tubes to form a stem of the front fork.

2. The method as claimed in claim 1, wherein the method further includes a step of grinding and polishing after the step of bending the two round tubes having the flattened and narrowed tube opening respectively downward and enabling the two round tubes parallel to each other; the step of grinding and polishing is used for surface treatment of the front fork.

3. A method for manufacturing an integrated aluminum alloy bicycle front fork comprising the steps of:
    A. preparing aluminum alloy substrate with certain volume;
    B. setting the substrate into a cavity of a first mold for a first die forging so that the substrate is forged to have a shape of the cavity of the first mold; the substrate is forged to form a blank with three round bars connected integrally and arranged radially while burr and waste material are generated;
    C. cutting and removing the burr and waste material of the blank generated at the first die forging;
    D. setting the blank into a cavity of a second mold for a second die forging so that the blank is forged to have a shape of the cavity of the second mold and the three round bars of the blank are extruded and extended in the cavity; simultaneously using a punch in the cavity driven into the three round bars of the blank for punching and molding a front part of each of the three round bars to form guide holes;
    E. drilling the blank along the guide holes on the front part of the round bar by drills and penetrating the three round bars of the blank to form three round tubes each of which is a hollow blank tube;
    F. shaping two of the three round tubes so that a front part of each of the two round tubes gets tapered toward a tube opening of the round tube and then flattening and narrowing the tube opening; and
    G. bending the two round tubes having the flattened and narrowed tube opening respectively downward and enabling the two round tubes parallel to each other, having a certain interval therebetween to form two fork tubes of a front fork while the rest one round tube is located over and between the two fork tubes to form a stem of the front fork.

4. The method as claimed in claim 3, wherein the method further includes a step of grinding and polishing after the step of bending the two round tubes having the flattened and narrowed tube opening respectively downward and enabling the two round tubes parallel to each other; the step of grinding and polishing is used for surface treatment of the front fork.

\* \* \* \* \*